(12) United States Patent
Adams et al.

(10) Patent No.: US 11,424,827 B1
(45) Date of Patent: Aug. 23, 2022

(54) OPTICAL TRACKING SYSTEM

(71) Applicant: AMAZON TECHNOLOGIES, INC., Seattle, WA (US)

(72) Inventors: Jeff Clark Adams, Seattle, WA (US); Donald Mitchell Cornwell, Bellevue, WA (US); Rui Zhang, Sammamish, WA (US); Markus Stefan Duelli, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/204,229

(22) Filed: Mar. 17, 2021

(51) Int. Cl.
*H04B 10/118* (2013.01)
*H04B 10/60* (2013.01)

(52) U.S. Cl.
CPC .......... *H04B 10/118* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 5,095,477 A | 3/1992 | Shimozawa | |
| 5,770,850 A | 6/1998 | Bowen et al. | |
| 6,509,992 B1* | 1/2003 | Goodwill | H04B 10/1141 398/129 |
| 7,493,046 B2* | 2/2009 | Kyoto | G08C 23/04 340/12.22 |
| 7,689,127 B1* | 3/2010 | Beffa | G02B 26/0825 398/122 |
| 2001/0040713 A1* | 11/2001 | Haruyama | H04B 10/116 398/140 |
| 2019/0346259 A1 | 11/2019 | Ulander et al. | |

FOREIGN PATENT DOCUMENTS

| | | |
|---|---|---|
| CN | 102879108 B | 8/2014 |
| EP | 0856958 A2 | 8/1998 |

OTHER PUBLICATIONS

"G6849 Data Sheet", Hamamatsu, InGaAs PIN photodiode, Data Sheet, 4 pgs. Retrieved from the Internet: URL: https://www.hamamatsu.com/resources/pdf/ssd/g6849_series_kird1042e.pdf.

(Continued)

*Primary Examiner* — Darren E Wolf
(74) *Attorney, Agent, or Firm* — Lindauer Law, PLLC

(57) ABSTRACT

An optical detector system provides output to an optical tracking system to facilitate optical communications by tracking a beam of incoming light using a fast-steering mirror (FSM). The optical detector system comprises an array of optical photodetectors, such array comprising one or more quad cells. The incoming light passes through one or more optical elements to generate a specified beam shape, such as a bar or cross, on the array. The resulting output from the array is highly responsive to changes in position of the reshaped beam on the array. As a result, noise equivalent angle (NEA) of the optical detector system representing pointing error is substantially reduced. A reduction in NEA facilitates more precise alignment, allowing incoming light to be aligned to a smaller area. For example, the incoming light may be aligned to a single mode optical fiber connected to a receiver system.

16 Claims, 11 Drawing Sheets

(56) References Cited

OTHER PUBLICATIONS

"G6849", Hamamatsu, InGaAs PIN photodiode, Product Details, 5 pgs. Retrieved from the Internet: URL: https://www.hamamatsu.com/us/en/product/type/G6849/index.html.
"InGaAs Quadrant Photodiodes", GAP Quadrant Photodiodes, GPD Optoelectronics Corp, 1 pg. Retrieved from the Internet: URL: https://www.gpd-ir.com/pdfs/8.0%20InGaAs%20Quadrant%20Photodiodes.pdf.
Mazalkova, Marketa, "The Laser Satellites Communications and Laser Noises", Communication and Information Systems Department, University of Defence vol. 7, Issue 8, Aug. 2008, 10 pgs. Retrieved from the Internet: URL: http://wseas.us/e-library/transactions/communications/2008/27-726.pdf.
Near, William G., "Spatial Tracker for an Air-to-Ground Laser Communication Link", Department of Electrical Engineering and Computer Science, Massachusetts Institute of Technology, Feb. 2012, 94 pgs. Retrieved from the Internet: URL: https://dspace.mit.edu/bitstream/handle/1721.1/77033/825819155-MIT.pdf?sequence=2.
Wang, et al., "Design of a Miniature CMOS APS Star Tracker", International Journal of Electronics and Electrical Engineering, vol. 4, No. 1, Feb. 2016, 7 pgs. Retrieved from the Internet: URL: http://www.ijeee.net/uploadfile/2015/0911/20150911054048176.pdf.
Patrovsky, Andreas, "International Search Report and the Written Opinion of the International Searching Authority dated Jun. 15, 2022", Patent Cooperation Treaty Application No. PCT/US22/70980, Patent Cooperation Treaty, Jun. 15, 2022.

\* cited by examiner

OPTICAL TRACKING SYSTEM

BACKGROUND

Wireless transmission of data provides many benefits. Wireless transmission using optical wavelengths such as infrared, visible light, and so forth, facilitates high data rates, and dense networks with reuse of those wavelengths.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
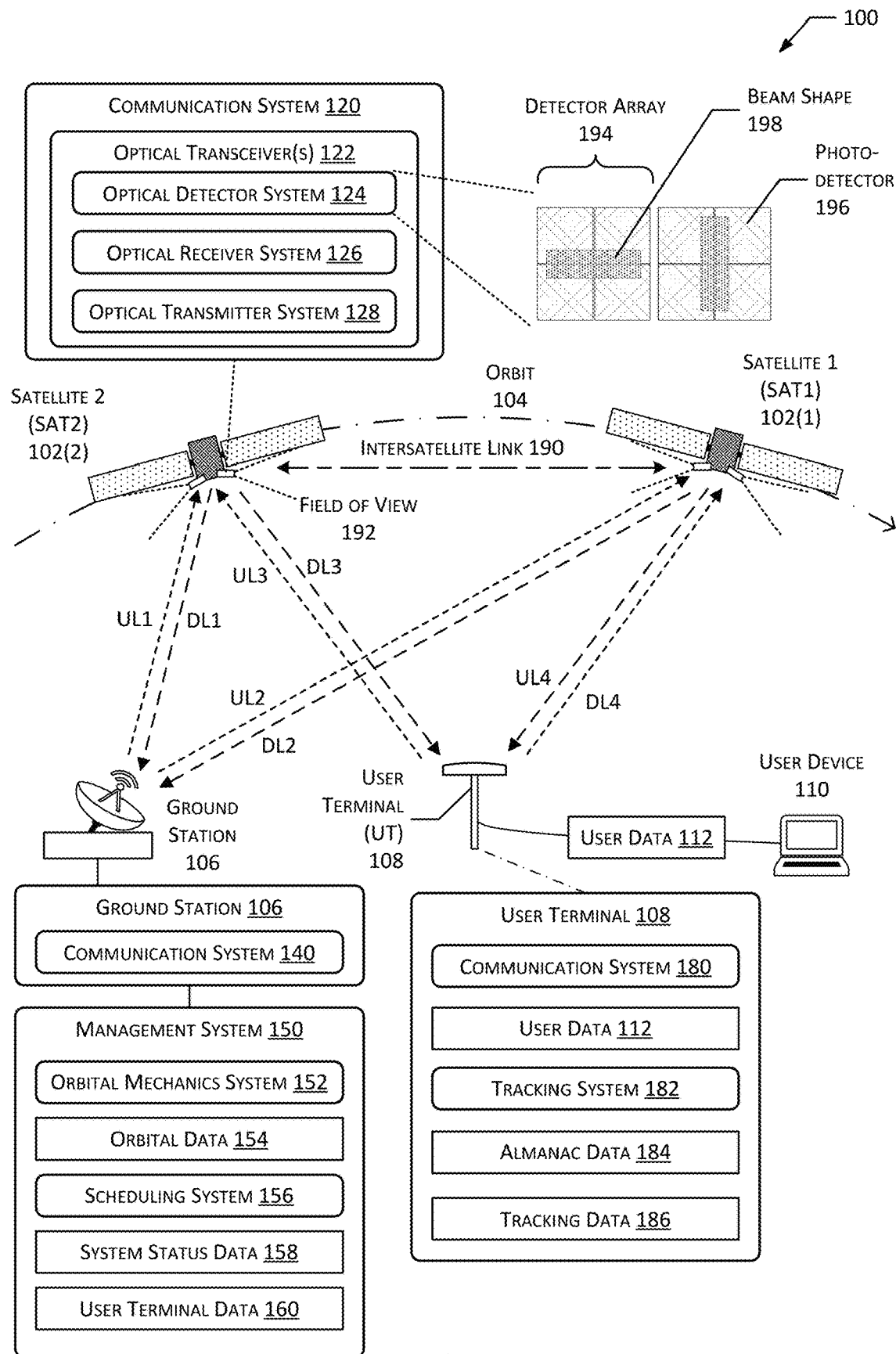
FIG. 1 illustrates a system using ground stations and a constellation of satellites each with an optical transceiver that uses optical wavelengths and an optical detector system to facilitate operation, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The ability to transmit data wirelessly provides tremendous utility. Wireless transmission uses one or more frequencies of electromagnetic signals, such as optical wavelengths, to send information. Optical wavelengths may include, but are not limited to, infrared wavelengths, visible light wavelengths, ultraviolet wavelengths, and so forth. An optical transceiver comprises a transmitter to send and a receiver to receive signals at optical wavelengths.

Optical wavelengths provide several benefits for data transfer. For example, the high frequencies of optical wavelengths allow high bit rates. Signals at optical wavelengths may be easier to direct in relatively small form factor devices. For example, a telescope may have less volume than a radio-frequency antenna with equivalent gain. Optical wavelengths provide other advantages as well. For example, the same wavelengths may be readily reused simultaneously for communication between different devices, electromagnetic interference from nearby devices may be eliminated, and so forth.

Optical wavelengths may move from one location to another in free space or within a waveguide. Free space may include atmosphere, vacuum, and so forth. In comparison, a waveguide such as an optical fiber may comprise a material such as glass or plastic with an index of refraction such that light at one or more optical wavelengths is propagated within.

A free space optical communication system may be used in a variety of different situations. For example, optical transceivers may be used to provide an intersatellite link between a first satellite and a second satellite, allowing data to be sent from the first satellite to another. In another example, a ground station may communicate with a satellite using an optical transceiver. In still another example, fixed terrestrial stations may communicate with one another using optical transceivers.

As with any system using electromagnetic signals, including optical wavelengths, the received signal must be received with a sufficient signal to noise ratio (SNR) to facilitate the desired communication. As the bit rates increase, the SNR requirements increase as well. By analogy, a person speaking rapidly is more easily understood in a quiet room than in a noisy hall.

To maintain a SNR that allows usable communication over a free space optical communication system, various techniques may be used. At the transmitter, one or more of the transmit power or gain may be increased. An example of increasing the transmit power may involve increasing the brightness of an omnidirectional light source. An example of increasing the gain may be to use reflectors and lenses to direct the light towards a receiver, or to use a directional light source such as a laser that produces a tightly collimated beam of light that is directed towards the receiver. This beam of light is typically circular in cross section.

To provide a needed SNR, at the receiver a more sensitive detector may be used, or gain may be increased. For example, gain may be increased by using a telescope to acquire light obtained from a relatively large lens and focus that light down to a relatively small detector. Continuing the example, incoming light may be coupled to a single mode optical fiber for delivery to a detector.

To maintain communication, it is necessary for the transmitter and the receiver to be pointed at one another and maintain that pointing. The transmitter is positioned so that the light from the transmitter is directed towards the receiver. Likewise, the receiver is positioned so that the light from the transmitter is received. For example, the light source that is transmitting needs to radiate light in the direction of the receiver, and the receiver needs to gather that light and process it with a detector.

During operation of a free space optical communication system, it may be necessary to keep the beam from the transmitter precisely pointed towards the receiver, and likewise keep the receiver precisely pointed towards the transmitter. For example, the beam of incoming light may need to remain on the optical fiber that directs that light to the detector in the receiver. The characteristics that make optical wavelengths useful for data transfer also introduce engineering complications. In particular, the narrowness of the beam of incoming light requires careful pointing of the receiving device to keep that incoming light on the detector of the receiver.

In the ideal situation in which the transmitter and the receiver are not in motion and neither is subject to any sort of vibration, maintaining such careful pointing could be done once and never repeated. However, all structures have some mechanical motion or vibration. A tower may sway in the wind, temperature changes cause materials to contract or expand, a motor elsewhere in the device causes some vibration during operation, and so forth. These motions can result in a failure of the receiver to remain properly pointed at the transmitter. Likewise, these motions can result in failure of the beam from the transmitter to remain properly pointed at the receiver. A device that is in motion and using optical communication, such as a satellite in orbit, introduces further complications.

To account for these motions, some form of active adjustment or feedback may be used. While the following descriptions are given with respect to an optical receiver, similar systems and techniques may be used with an optical transmitter.

The active adjustment may include an optical detector system that provides output about how far a beam of incoming light deviates from a specified reference. The output signal(s) from the optical detector system may then be used to operate actuators affixed to a moveable mirror or other optical element. A feedback loop attempts to keep the incoming light aligned to a particular predetermined point, such as an optical fiber or center of a detector array, by using the output to operate the actuators. For example, the detector array may comprise four photodetectors arranged into a two-by-two detector array, also known as a "quad cell". As light impinges on each of the photodetectors, an output signal is generated by the individual photodetector. The photodetectors allow for high sensitivity and high sample acquisition rates during operation. There may be gaps between adjacent photodetectors, resulting in "blind spots" or areas in which no output signal is produced by incident light.

Traditional optical detector systems utilize an incoming beam with a beam shape that is circular in cross section, presenting a circular pattern (or "spot") of light on the detector array. The combined characteristics of the detector array and spot produce a particular transfer function. The transfer function describes how much the output of the detector array changes in response to a change in the position of the light incident on the detector array. For example, the transfer function describes how amplitude of an output signal from the photodetectors in the array changes as the spot moves across the detector array. A slope factor ("SF") describes how rapidly a portion of the transfer function changes. For example, a relatively low SF means that a relatively large movement of the spot across detector array will produce a relatively small change in the output. In contrast, a relatively high SF means that a relatively small movement of the spot across the detector array will produce a relatively large change in the output. The greater the slope factor, the easier it is to detect a change in position of the beam on the detector array. Said another way, increasing SF improves the responsiveness to changes in the location of the beam.

The transfer function, and corresponding SF, is affected by several factors. One factor is how much of the incoming beam of light that impinges on the detector array produces output. The portion of the beam that impinges on photodetectors in the array produces output. The portion of light that impinges on gaps between the photodetectors does not. For example, if the spot of light falls entirely within a gap between photodetectors, no output is produced.

A noise equivalent angle (NEA) is representative of a pointing error present in an optical detector system. For example, a NEA of 1 microradians indicates that the system exhibits a pointing error of 1 microradian at any given instant. The NEA may be determined based on the SF and the optical SNR. As SF increases, the NEA decreases. Said another way, increasing the SF improves the NEA. The more precisely the beam of incoming light needs to be aligned to the detector of the receiver, the lower the NEA needs to be for the system to function.

Described in this disclosure are techniques to use optical elements to reshape incoming light to generate a non-spot beam shape on a detector array. This produces a substantial change in the transfer function compared to a traditional spot beam shape, and produces a corresponding substantial improvement in the corresponding slope factor. The substantial improvement in the slope factor results in a significant decrease in the NEA. This in turn improves the responsiveness of the system while tracking and facilitates operation of a free space optical link over longer distances.

A non-spot beam shape is a beam shape, where it impinges upon the detector array, that is non-circular in cross section. The non-spot beam shape may be symmetrical with respect to one or more axes. For example, the non-spot beam shape may be a rectangle with an aspect ratio of at least 2:1. In another example, the non-spot beam shape may be a cross shape comprising two perpendicular overlapping rectangles centered on one another.

Different configurations of non-spot beam shapes and detector arrays may be used. In one implementation, a rectangular beam shape may be provided on a 2×2 detector array. This allows for output to be obtained that is representative of distance and direction of the rectangle along a single axis that is perpendicular to a long axis of the rectangle. In another implementation, the incoming light may be divided and reshaped to provide a first rectangle on a first detector array and a second rectangle on a second detector array, with the first rectangle perpendicular to the second rectangle. First output from the first detector array may be used to determine azimuth information about the incoming beam. Second output from the second detector array may be used to determine elevation information about the incoming beam.

The optical detector system described provides output that is indicative of a relative position of an incoming beam of light relative to the detector array as well as distance of the incoming beam of light relative to the detector array. This output may then be used to operate a moveable mirror or other device to provide active tracking of a beam of incoming light.

The system may be used in a variety of applications including, but not limited to intersatellite communications, communications between a satellite and ground station, communications between a satellite and user terminals, between vehicles, between terrestrial stations, and so forth. For example, the system may be used in terrestrial applications, mobile applications, and so forth.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals with various wavelengths, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because of the period that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UTs) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth. For example, the orbit 104 is a low earth orbit (LEO). In this illustration, the orbit 104 is depicted with an arc pointed to the right. A first satellite (SAT1) 102(1) is leading (ahead of) a second satellite (SAT2) 102(2) in the orbit 104.

The satellite 102 comprises a communication system 120. The communication system 120 may include one or more optical transceivers 122. The optical transceiver 122 uses optical wavelengths such as infrared light, visible light, ultraviolet light, and so forth for communication. The optical transceiver 122 may include an optical detector system 124 and one or more of an optical receiver system 126 or an optical transmitter system 128. The optical detector system 124 provides information about a relative alignment of incoming light. This information may then be used to adjust actuators that direct the incoming light into a desired alignment. For example, the optical detector system 124 may determine a distance and direction that the incoming light transmitted by an optical transmitter system 128(2) from the second satellite 102(2) is off center. One or more actuators may be operated responsive to this information to center the incoming light. Output from the optical detector system 124 may be part of a feedback loop that attempts to track the incoming light and maintain a desired alignment of the incoming light. For example, tracking keeps a beam of incoming light centered on an optical fiber that directs the incoming light to a photodetector 196 that is then used to detect changes in the incoming light that are used to send data. Operation of the optical detector system 124 is discussed in more detail in the following description.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data 112 or other data between the one or more communication networks and the satellites 102. Such data may be processed by the ground station 106 and communicated via the communication system 140. The communication system 140 of a ground station 106 may include components similar to those of the communication system 120 of a satellite 102 and may perform similar communication functionalities. For example, the communication system 140 may include one or more optical transceivers 122. In other implementations, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data 112. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data 112 associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of a communication system 120 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data 112 between the constellation of satellites 102 and the user device 110. The user data 112 includes data originated by the user device 110 or addressed to the user device 110. The UT 108 may be fixed or in motion. For example, the UT 108 may be used at a residence, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information at a specified time. The determination of the tracking data 186 may be ongoing. For example, the UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, the optical transceivers 122 may be used to provide an intersatellite link 190 that provides for communication between satellites 102 in the constellation. In some implementations the uplink(s) and downlink(s) may use radio wavelengths while the intersatellite link(s) 190 use optical wavelengths. In other implementations, one or more of uplink(s) or downlink(s) may be use optical transceivers 122.

The intersatellite link 190 allows the satellites 102 to transfer data between one another. This data may include tracking, telemetry, and control data. For example, satellite 102(2) may be out of range of a ground station 106 and sends telemetry data using the intersatellite link 190 to satellite 102(1). Satellite 102(1) then relays the telemetry data to the ground station 106 that in turn sends the telemetry data to the management system 150. The intersatellite link 190 may also be used to send user data 112. For example, if ground station 106(1) is unavailable to handle downlink traffic from satellite 102(1), then satellite 102(1) may use the intersatellite link 190 to send the user data 112 to satellite 102(2) that is in communication with ground station 106(2). In another example, user data 112 from a first UT 108(1) that is addressed to a second UT 108(2) may be sent from the first satellite 102(1) to the satellite 102(X) that is providing service to the second UT 108(2) using the intersatellite link 190.

The satellites 102 within the constellation have different orbital parameters. This results in a variety of possible relative motions between satellites 102 in the constellation. For example, if the satellite 102(1) is in an equatorial orbit at a first altitude and satellite 102(2005) is in a polar orbit at a second altitude, they may only be within communication range of one another for a few minutes. Due to the different relative positions of those satellites 102 with respect to Earth at any given time, satellites 102 in the constellation are affected in various ways. For example, satellite 102(2) may experience a slight increase in altitude from a predicted position due to a slight variation in Earth's gravitational field. In another example, a satellite 102 that is in sunlight will experience light pressure causing some slight movement from a predicted position. Additionally, thermal effects such as expansion and contraction, operation of actuators, and so forth introduce vibration into the structure of the satellite 102.

The optical transceivers 122 have a field of view 192. For example, the field of view (FOV) 192 may be determined based on the focal length of an optical system such as a telescope. In one implementation the FOV 192 describes a solid angle within which incoming light will be acquired and directed to various parts of the optical transceiver 122, such as a detector within the optical receiver system 126. For communication to take place, a first beam of light sent by an optical transmitter system 128(2) of the second satellite 102(2) must be within a first FOV 192(1) of the optical transceiver 122(1) of the first satellite 102(1). For bidirectional communication between the satellites 102, the converse must also be true. Continuing the example, a second beam of light sent by an optical transmitter system 128(1) of the first satellite 102(1) must be within a second FOV 192(2) of the optical transceiver 122(2) of the second satellite 102(2).

Because of the dynamic motion of the satellites 102, variances between predicted positions compared to actual positions, vibration, and other factors, it is advantageous to track incoming light to maintain communication. The optical detector system 124 facilitates this tracking by providing information as to a relative location of incoming light with respect to one or more detector arrays 194. Each detector array 194 may comprise a plurality of photodetectors 196. Output from the optical detector system 124 may then be used to provide for active tracking. For example, output from the optical detector system 124 may be used to adjust a moveable mirror in the optical transceiver 122 to maintain the incoming light in a desired alignment. Continuing the example, the desired alignment may place a spot of the incoming light onto an optical fiber that provides the incoming light to a detector of the optical receiver system 126. In some implementations, the optical transmitter system 128 may utilize a portion of the same optical path. For example, outgoing light from the optical transmitter system 128 may also impinge on the moveable mirror and thus is directed towards optics of the remote optical transceiver 122.

To facilitate operation, the optical detector system 124 may utilize one or more optical components to provide a beam shape 198 on the detector array 194 that is not circular in cross section. This non-spot beam shape 198 provides for an improved slope factor (SF) during operation, substantially reducing the noise equivalent angle (NEA) of the optical detector system 124. This is discussed in more detail below regard to FIGS. 4-11.

The satellite 102, the ground station 106, the user terminal 108, the user device 110, the management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
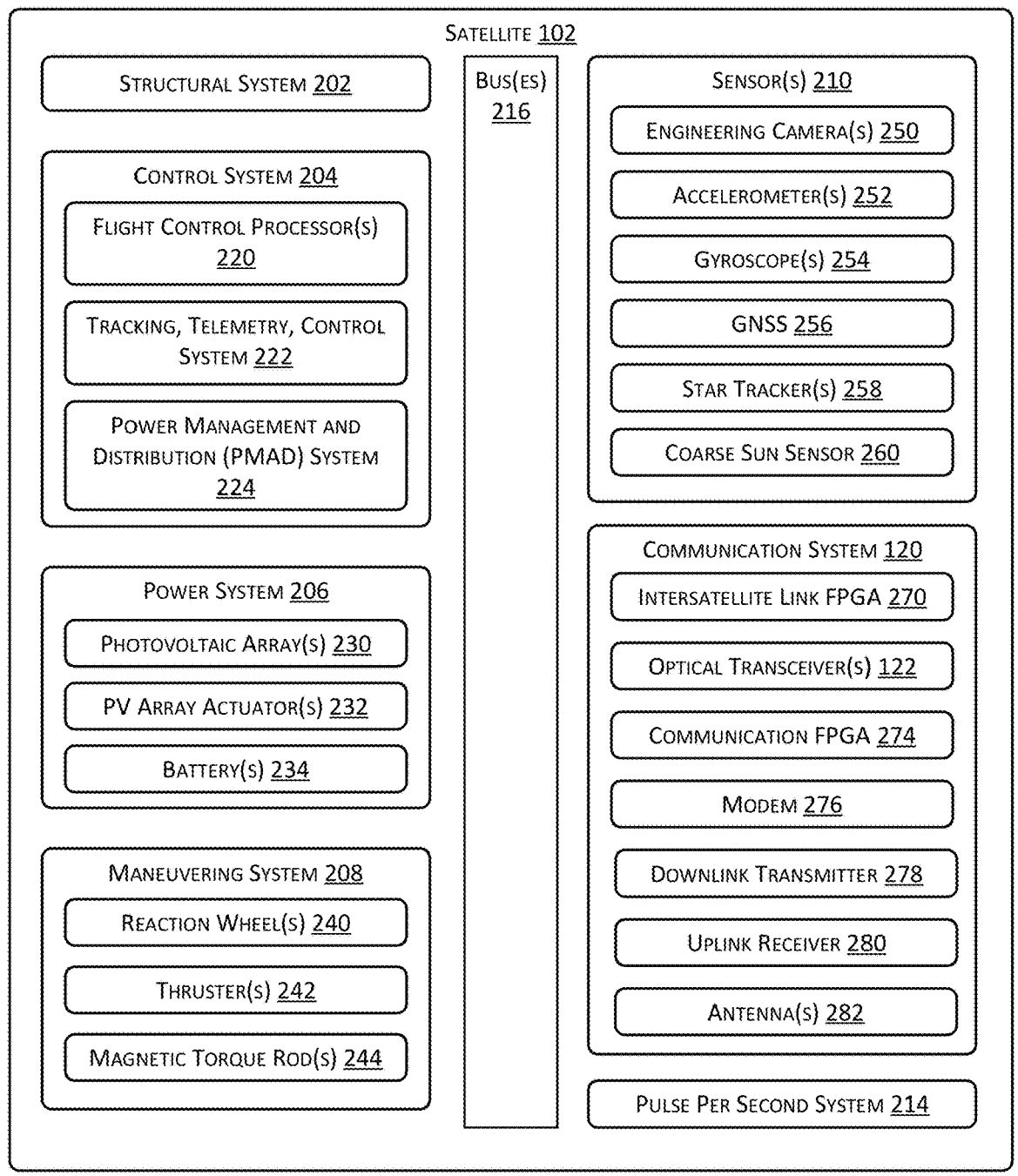
FIG. 2 is a block diagram of some systems associated with the satellite, according to some implementations.

FIG. 2 is a block diagram of some systems associated with the satellite 102, according to some implementations. The satellite 102 may comprise a structural system 202, a control system 204, a power system 206, a maneuvering system 208, one or more sensors 210, and a communication system 120. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 120. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more photovoltaic (PV) array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 120 provides communication with one or more other devices, such as other satellites 102, ground stations 106, user terminals 108, and so forth. The communication system 120 may include one or more modems, digital signal processors, power amplifiers, antennas (including at least one antenna that implements multiple antenna elements, such as a phased array antenna), lasers, telescopes, photodetectors, processors, memories, storage devices, communications peripherals, interface buses, and so forth. Such components support communications with other satellites 102, ground stations 106, user terminals 108, and so forth using various wavelengths. The communications may involve multiplexing, encoding, and compressing data to be transmitted, modulating the data to a desired frequency, and amplifying it for transmission. The communications may also involve demodulating received signals and performing any necessary de-multiplexing, decoding, decompressing, error correction, and formatting of the signals. Data decoded by the communication system 120 may be output to other systems, such as to the control system 204, for further processing. Output from a system, such as the control system 204, may be provided to the communication system 120 for transmission.

The communication system 120 may include hardware to support the intersatellite link 190. For example, an intersatellite link FPGA 270 may be used to modulate data that is sent and received by an optical transceiver 122 to send data between satellites 102. The optical transceiver 122 may operate using optical wavelengths.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The downlink transmitter(s) 278 and uplink receiver(s) 280 may be implemented as a transceiver. The transceiver may be connected to one or more antennas 282. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The phased array antenna contains many elements and uses slight differences in timing or phase of the signals to produce a beamforming effect that directs a signal to transmit or receive in a particular direction relative to the phased array antenna. For example, a phased array antenna system may include antenna control electronics controlling a radio frequency (RF) feeding network. The RF feeding network may include a plurality of signal conditioning components interposed between antenna elements and the transceivers. The signal conditioning components introduce one or more of a phase modulation or an amplitude modulation to the signal sent to the antenna elements. This introduces a progressive phase modulation and produces interference in the individual transmission of each antenna element, producing directivity or gain in a particular direction. The phase modulation imposed on each antenna element will differ and will be dependent on a spatial location of a communication target that determines an optimum beam vector (e.g., where the beam vector is found by one or more of maximizing signal intensity or connection strength). The optimum beam vector may change with time, such as when a communication target moves relative to the phased array antenna system.

Figure 3:
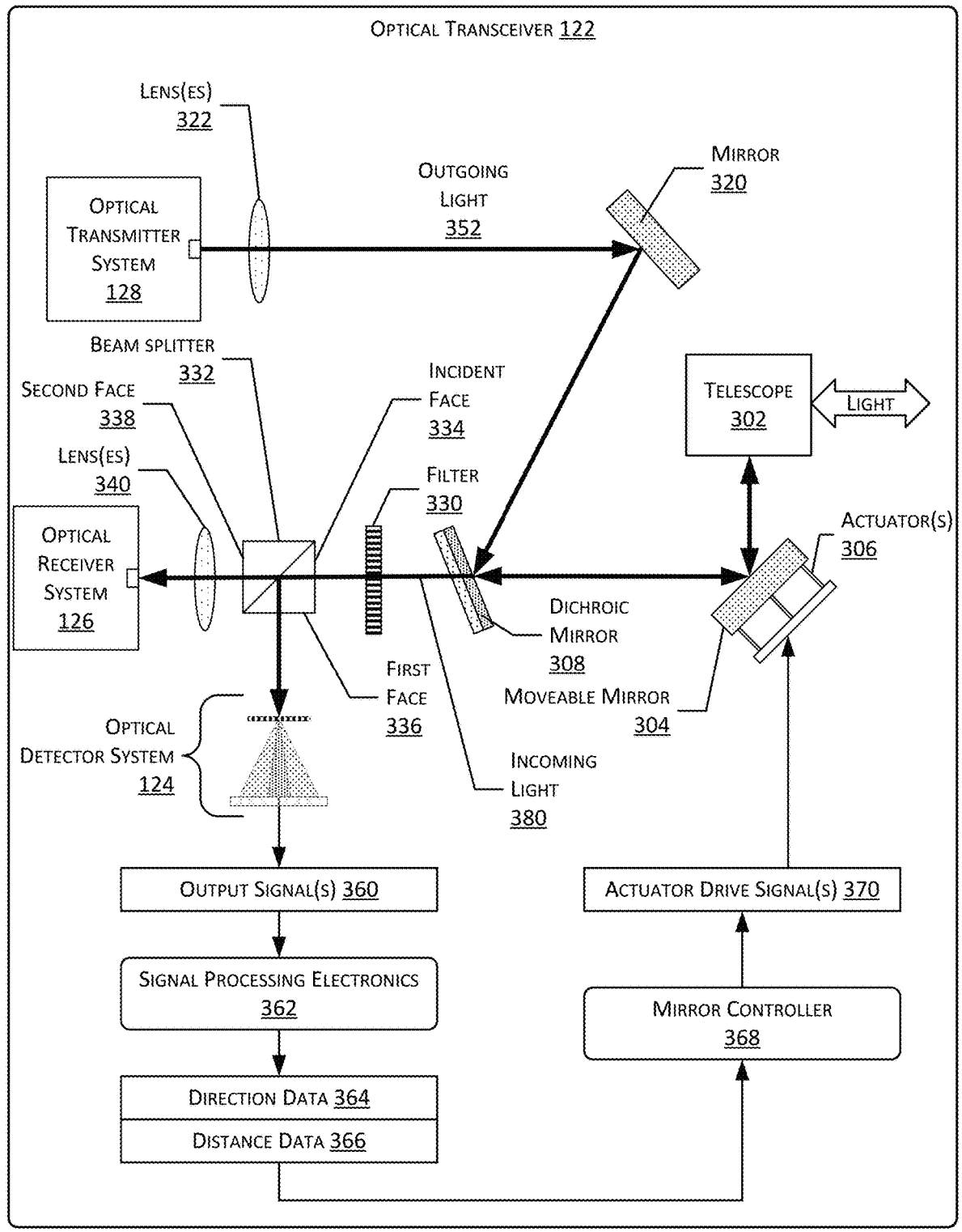
FIG. 3 is a block diagram of the optical transceiver, according to some implementations.

FIG. 3 is a block diagram 300 of the optical transceiver 122, according to some implementations. A telescope 302 or other arrangement of optical elements may be used to acquire incoming light 380 and emit outgoing light 352. An optical path of the optical transceiver 122 may include one or more moveable mirrors 304 with one or more associated actuators 306. During operation, the one or more moveable mirrors 304 may change a path of one or more of the incoming light 380 or the outgoing light 352. In some implementations the moveable mirror 304 and the actuator 306 may comprise a microelectromechanical system. In some implementations the actuators 306 may comprise motors, piezoelectric devices, voice coils, and so forth. For example, a fast steering mirror (FSM) comprising a mirror that is moved based on activation of a voice coil may be used as the moveable mirror 304 and the actuator 306.

A dichroic mirror 308 may be used to selectively direct particular wavelengths of light between the optical transmitter system 128 and the optical receiver system 126. For example, the dichroic mirror 308 may pass incoming light 380 with a first wavelength to the optical receiver system 126 while reflecting outgoing light 352 with a second wavelength.

The optical transmitter system 128 may comprise a light source, such as a light emitting diode, quantum doc, laser, and so forth. The optical transmitter system 128 also includes one or more devices to modulate and amplify light from the light source to produce outgoing light 352. The optical transmitter system 128 accepts data for transmission during operation.

The outgoing light 352 may pass through one or more lenses 322, mirrors 320, and so forth. The outgoing light 352 may be incident to the dichroic mirror 308 and then subsequently is reflected to the moveable mirror 304. The moveable mirror 304 reflects the outgoing light 352 into the telescope 302. The telescope 302 directs the outgoing light 352 towards the receiving optical transceiver 122, such as in another satellite 102, at a ground station 106, and so forth.

The incoming light 380 is directed by the dichroic mirror 308 towards the optical receiver system 126. In some implementations a filter 330 may be in the optical path. The filter 330 may be used to removed unwanted or undesirable wavelengths of light. The incoming light 380 may pass through a beam splitter 332. In this illustration, the beam splitter 332 is depicted as a cubical beam splitter comprising two triangular prisms. In other implementations other beam splitter designs may be used, such as a half-silvered mirror.

In one implementation the beam splitter 332 may have an incident face 334, a first face 336, and a second face 338. For example, the beam splitter 332 may comprise a cubical beam splitter. The incident face 334 is a portion of the beam splitter 332 upon which the incoming light 380 impinges. The first face 336 comprises a portion of the beam splitter 332 from which a first portion of the incoming light 380 is emitted. For example, the first face 336 may comprise the face from which a reflection of the incoming light 380 is directed. The second face 338 comprises a portion of the beam splitter 332 from which a second portion of the incoming light 380 is emitted. For example, the second face 338 may comprise the face from which the incoming light 380 is transmitted or not otherwise reflected and may be directed towards the optical receiver system 126.

The incoming light 380 emitted from the first face 336 passes into the optical detector system 124. The detector array 194 provides as output one or more output signals 360. For example, each photodetector 196 may provide an output signal 360 having a current that is representative of the power of incident light incident on that photodetector 196.

The output signals 360 may be processed by signal processing electronics 362. The signal processing electronics 362 may accept the analog signals from the photodetectors 196 as input and provide as output digital data. For example, the signal processing electronics 362 may comprise one or more of an ammeter, transimpedance amplifier, analog to digital converter (ADC), and so forth. In some implementations the signal processing electronics 362 may include one or more processors. These processors may perform one or more functions, including but not limited to denoising, averaging, and so forth.

The signal processing electronics 362 may provide as output direction data 364 and distance data 366. The direction data 364 may be indicative of a direction of a center of the incoming light 380 with respect to one or more axes and relative to a predetermined point on the detector array 194. For example, the direction data 364 may be indicative of an angle. The distance data 366 may be indicative of a distance of a center of the incoming light 380 with respect to the predetermined point relative to the detector array 194. For example, the distance data 366 may be indicative of a distance in micrometers. In some implementations the direction data 364 and the distance data 366 may be combined. For example, the output from the signal processing electronics 362 may be indicative of a set of cartesian coordinates with respect to the X and Y axes of the detector array 194. A set of coordinates would thus indicate direction and distance of the first portion or spot relative to an origin of the axes, where the origin coincides with the predetermined point such a center of the detector array 194.

The output from the signal processing electronics 362 may be provided to a mirror controller 368. For example, the mirror controller 368 may comprise a processor that accepts the direction data 364 and the distance data 366 and determines a magnitude and direction of movement of the moveable mirror 304. The mirror controller 368 may generate as output one or more actuator drive signals 370. The actuator drive signals 370 may then be used to operate the one or more actuators 306. When operated, the actuators 306 move the moveable mirror 304, changing the path of the light incident thereon.

The system may thus operate in a feedback loop, with the output from the optical detector system 124 resulting in the actuator drive signals 370 that may be used to provide tracking. During tracking, the path of the incoming light 380 is changed by the movement of the moveable mirror 304 to maintain the desired alignment of the incoming light 380. This desired alignment may result in the light entering the optical receiver system 126. For example, by aligning the incoming light 380 with respect to the detector array 194 the incoming light 380 is also aligned with respect to the optical input of the optical receiver system 126.

The incoming light 380 emitted from the second face 338 may pass through one or more lenses 340 before entering the optical receiver system 126. The optical receiver system 126 may comprise one or more optical amplifiers, detectors, demodulators, and so forth. During operation, the optical receiver system 126 may provide data as output.

In other implementations other arrangements of the various components of the optical transceiver 122 or a portion thereof may be used. For example, a combination device that operates as a dichroic filter 308 and beam splitter 332 may be used. In another implementation the filter 330 may be omitted. In some implementations, the optical transmitter system 128 may be omitted and the resulting system is limited to receiving data. In other implementations the optical receiver system 126 may be omitted and the resulting system is limited to transmitting data.

Figure 4:
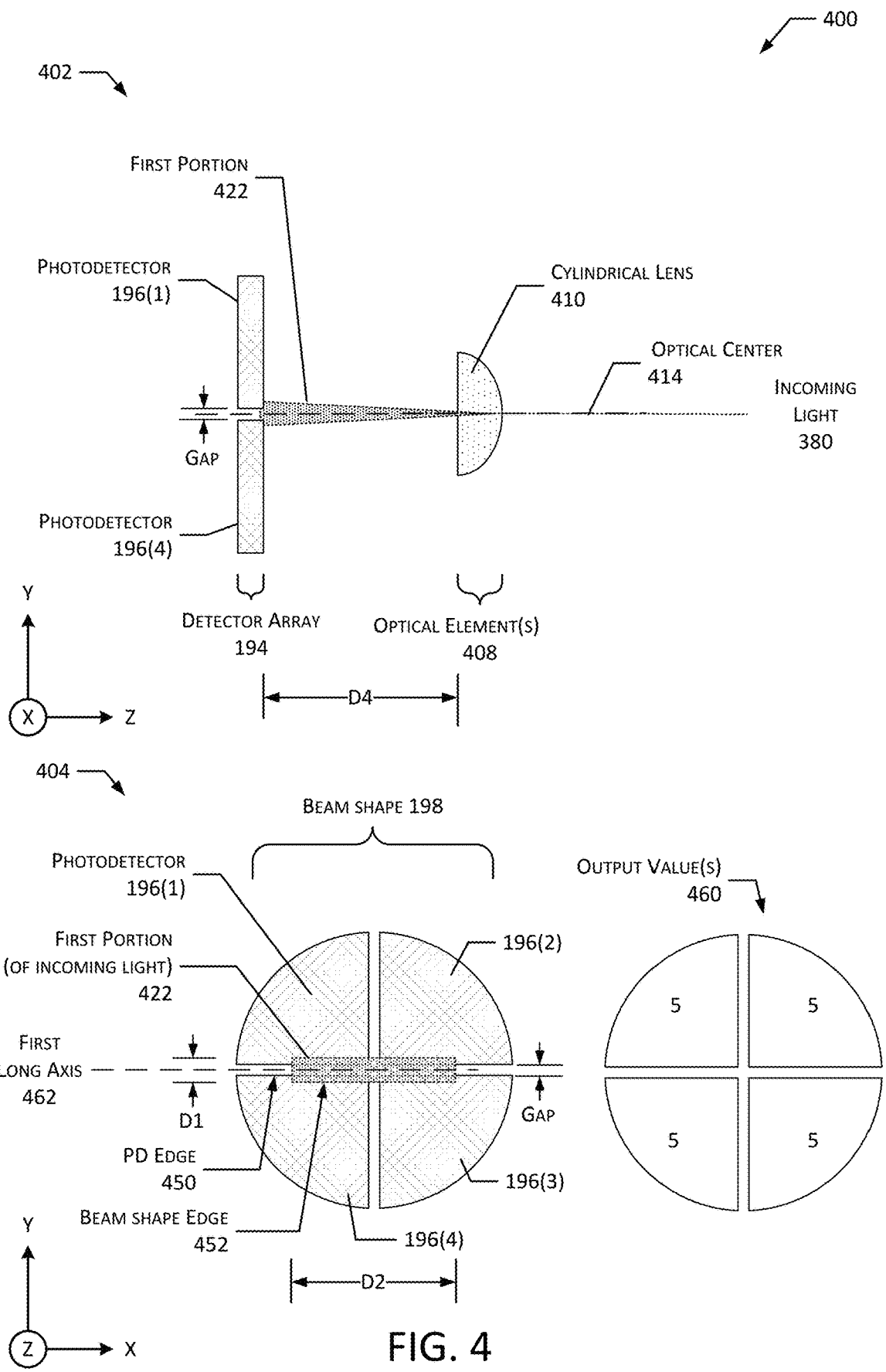
FIG. 4 is a block diagram of a first implementation of the optical detector system with a detector array and beam-shaping element to provide a rectangular beam shape on the detector array, according to some implementations.

FIG. 4 is a block diagram 400 of a first implementation of the optical detector system 124 with a detector array 194 and beam-shaping element to provide a rectangular beam shape 198 on the detector array 194, according to some implementations.

In this illustration a side view 402 of the optical detector system 124 is shown as well as a front view 404 of the detector array 194 in this implementation.

The optical detector system 124 comprises a detector array 194. The detector array 194 comprises a plurality of photodetectors 196. The photodetectors 196 may comprise photomultiplier tubes (PMT), silicon photomultipliers, avalanche photodiodes, and so forth. In one implementation, the detector array 194 may comprise four photodetectors 196 (1)-(4) arranged in a two-by-two array. For example, the detector array 194 may comprise four indium gallium arsenide (InGaAs) photodiodes in a common package, such as the G6849 series from Hamamatsu Photonics K.K. of Japan. As shown in the front view 404, the four photodetectors 196(1)-(4) are arranged such that the first photodetector 196(1) is adjacent to the second photodetector 196(2), the second photodetector 196(2) is adjacent to the third photodetector 196(3), the third photodetector 196(3) is adjacent to the fourth photodetector 196(4), and the fourth photodetector 196(4) is adjacent to the first photodetector 196(1). In other implementations the detector array 194 may use other arrangements of a plurality of photodetectors 196. For example, if tracking with respect to a single axis is needed, two or more photodetectors 196 may be arranged in a line. In another example, the detector array 194 may comprise an eight-by-eight array of 64 photodetectors 196. In still another example, the detector array 194 may comprise an imaging device such as a charge coupled device (CCD), complementary metal oxide semiconductor (CMOS) imager, and so forth.

The photodetectors 196 provide as output a signal that is indicative of light incident upon their active area. For example, light incident on an active portion of a photodetector 196 may produce an output current that is proportionate to power of the incident light. Individual photodetectors 196 may be separated from one another by a gap. For example, the gap may be 30 micrometers.

The optical detector system 124 includes one or more optical elements 408. At least a portion of the optical elements 408 reshape the beam of incoming light 380 into a non-spot beam shape 198. Non-spot beam shapes 198 may include, but are not limited to, rectangles, crosses, and so forth. Several non-spot beam shapes 198 are described with regard to FIG. 9.

To provide for beam reshaping, the optical elements 408 may include one or more lenses such as a cylindrical lens 410 or other elements comprising a plurality of diffractive features. The detector array 194 and the optical elements 408 may be aligned along an optical center 414. For example, the optical center 414 may be indicative of a line that is centered on the detector array 194 and is perpendicular to a plane of the detector array 194.

The lenses may include one or more of convex lenses, meniscus lenses, concave lenses, and so forth. The one or more lenses may focus incoming light 380 onto one or more of the elements used to generate the desired beam shape 198. For example, one or more lenses may focus the incoming light 380 onto the cylindrical lens 410 to generate a first portion 422 of the incoming light 380 that results in a non-spot beam shape 198 on the detector array 194, such as the rectangle shown in the front view 404. The rectangular first portion 422 is shown with a first dimension D1 and a second dimension D2, where D2 is greater than D1. In the implementation shown here, D1 is greater than the gap between photodetectors. For example, if the gap is 20 micrometers, D1 may be 44 micrometers. A first long axis 462 of the first portion 422 is perpendicular to the direction for which data is to be obtained. For example, in this illustration the first long axis 462 is parallel to the X axis and the output values 460 provided by the detector array 194 may be used to determine a position of the first portion 422 along the Y axis. As used in this disclosure, parallel and perpendicular may be specified with respect to an acceptable tolerance. For example, "parallel" may be used to indicate two lines that intersect to describe an angle of less than 20 degrees. In another example, "perpendicular" may be used to indicate two lines that intersect to describe an angle of between 70 and 110 degrees.

A beam shape edge 452 is parallel to a photodetector edge 450. For example, the long edges of the rectangular beam shape 198 shown here are parallel to the PD edges 450 in the horizontal gap that parallels the X axis. In some implementations, at least one edge of the beam shape 198 impinging upon the detector array 194 is parallel to a photodetector edge 450 within a gap.

The first portion 422 covers a first area on the detector array 194. In some implementations, the intensity of the light within the first portion 422 may be approximately uniform. When the incoming light 380 is aligned with the optical center 414, the first portion 422 is centered on the detector array 194, as shown here.

The one or more optical elements 408 may comprise one or more diffractive features. For example, an optically transparent substrate may be provided with a plurality of diffractive features that reshape the incoming light 380 from a spot into the non-spot beam shape 198.

The position of the optical elements 408 relative to one or more of the detector array 194 or lens(es) may be fixed. For example, the detector array 194 and the optical element 408 may be affixed to a common frame to maintain distance D4. By remaining fixed, the mass of the optical detector system 124 and assembly thereof is improved.

In the example shown here, the first portion 422 is centered on the detector array 194. The first portion 422 is evenly divided across the four photodetectors 196(1)-(4). As a result, the corresponding output values 460 of the photodetectors 196 are all equal. As the first portion 422 moves along the Y axis, the corresponding output values 460 from horizontally paired photodetectors 196 will change. For example, a first the output values 460 from photodetectors 196(1) and 196(2) may be paired by summing to provide a first value. Likewise, the output values 460 from photodetectors 196(3) and 196(4) may be paired by summing to produce a second value. Based on the first value and the second value, a determination may be made as to the placement of the first portion 422 with respect to the Y axis.

Figure 5:
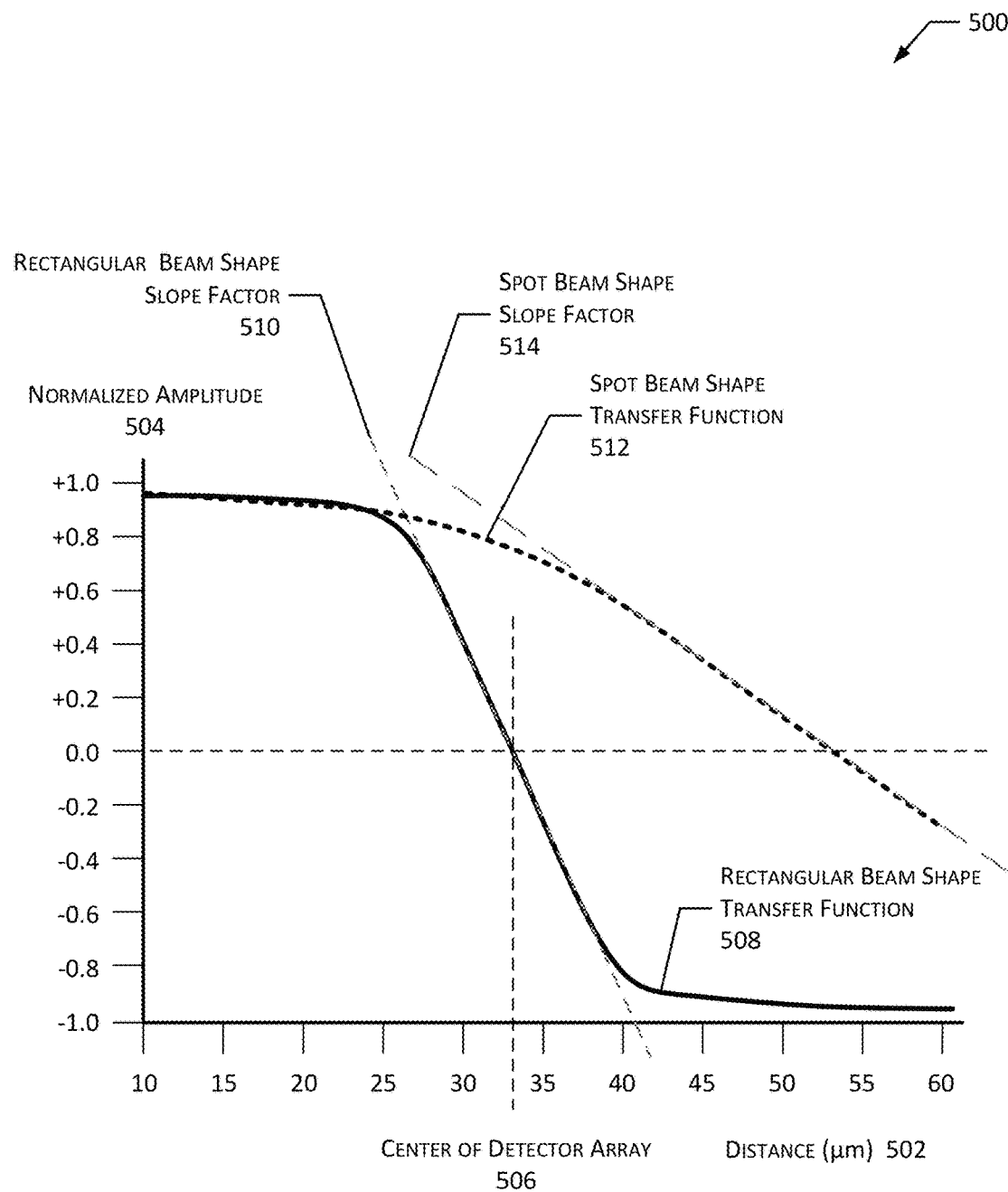
FIG. 5 is a graph depicting transfer functions and corresponding slope factors of a rectangular beam shape compared to a spot beam shape, according to some implementations.

FIG. 5 is a graph 500 depicting two transfer functions, according to some implementations. The transfer function describes how much the output of the detector array 194 changes in response to a change in the position of the light incident on the detector array 194. A horizontal axis depicts a distance (in micrometers) 502 of a beam center with respect to a quad cell detector array 194. A vertical axis depicts output from the detector array 194 as a normalized amplitude 504 of −1.0 to +1.0. For comparison, the distance 502 corresponding to a center of detector array 506 is depicted at approximately 33 micrometers.

A rectangular beam shape transfer function 508 is depicted that represents output resulting from the rectangular beam shape 198 impinging upon and traversing the detector array 194 from +Y to −Y, consistent with the illustration in FIG. 4. The rectangular beam shape 198 in this example has a first dimension D1 of 44 micrometers. The gap is assumed to be 20 micrometers.

A slope factor may be determined by performing a linear curve fit around the zero crossing of the normalized amplitude 504 of a given transfer function. A rectangular beam shape slope factor 510 is shown.

Also depicted is a spot beam shape transfer function 512. The spot beam shape transfer function 512 depicts the transfer function of a circular beam shape 198 having a diameter of 100 micrometers. A spot beam shape slope factor 514 is depicted.

Comparing the rectangular beam shape slope factor 510 with the spot beam shape slope factor 514 demonstrates that the rectangular beam shape 198 depicted as the first portion 422 in FIG. 4 provides a substantially greater slope factor (SF) compared to a conventional spot beam shape 198. In practice this means that a relatively small movement by the first portion 422 along the Y axis of the detector array 194 results in a substantial change in the normalized amplitude 504 of the output of the detector array 194, compared to the conventional circular spot beam.

A noise equivalent angle (NEA) is representative of a pointing error present in an optical detector system 124. The NEA may be calculated using the following equation:

$$NEA = \frac{1}{(SF * SNR)}$$

where SF is slope factor in radians$^{-1}$ and SNR is the optical signal-to-noise ratio. (Equation 1)

As the SF increases, the NEA decreases. Said another way, by increasing the slope factor of the transfer function associated with operation of the optical detector system 124, the pointing error is decreased. Decreasing the pointing error allows the optical detector system 124 to track and maintain incoming light 380 on a smaller target area, such as an optical fiber that conveys the incoming light 380 to a detector in the optical receiver system 126.

This substantial increase in SF results from the non-spot beam shape 198 that impinges on the detector array 194. Further increases in the SF may be made by utilizing different configurations of detector array 194. For example, a two element detector array 194 may be used, reducing the area of the detector array 194 that is associated with a gap. In another example, a detector array 194 may have a gap size of 1 micrometer, reducing the area associated with the gap.

The area and intensity per unit area of the non-spot beam shape 198 may be configured to provide maximum response from individual photodetectors 196 in the detector array 194. For example, the dimensions of D1 and D2 of the first portion 422 may be sized to present on the detector array 194 a maximum intensity per unit area that is less than a saturation level of an individual photodetector 196.

Figure 6:
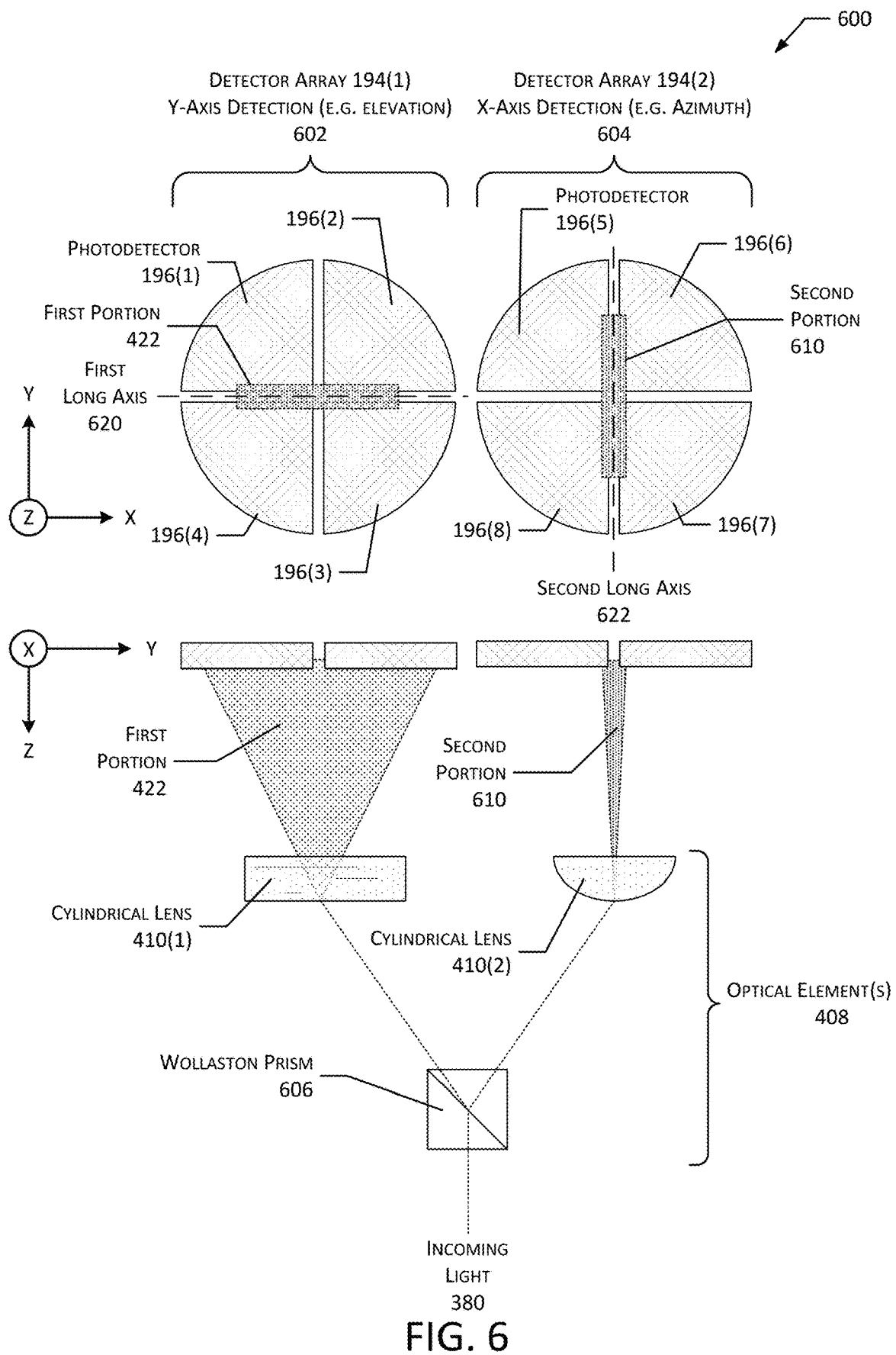
FIG. 6 is a block diagram of a second implementation of the optical detector system with a pair detector arrays and a pair of perpendicular rectangular beam shapes, according to some implementations.

FIG. 6 is a block diagram 600 of a second implementation of the optical detector system 124 comprising a pair detector arrays 194 and a pair of perpendicular rectangular beam shapes 198, according to some implementations.

In this implementation, the advantages of the increased slope factor resulting from the implementation in FIG. 4 may be further extended by providing a second detector array 194 to provide for two-dimensional tracking. For example, the implementation shown in FIG. 6 may provide first output that provides tracking information with respect to the Y axis and second output that provides tracking information with respect to the X axis.

The optical elements 408 may comprise one or more components that operate as a beam splitter 332 and one or more beam shaping elements. The beam splitter 322 may comprise a Wollaston prism 606, while the beam shaping elements may comprise cylindrical lenses 410. The incoming light 380 is accepted at the Wollaston prism 606 that splits the incoming light 380 into the first portion 422 and a second portion 610. The first portion 422 of the incoming light 380 impinges upon the first cylindrical lens 410(1) and is reshaped to provide a first rectangular beam shape 198(1) on a first detector array 194(1). This provides Y-axis detection 602, such as elevation information. A first long axis 620 of the first rectangle is parallel to the X axis of the first detector array 194(1). The second portion 610 of the incoming light 380 impinges upon a second cylindrical lens 410(2) and is reshaped to provide a second rectangular beam shape 198(2) on a second detector array 194(2). This provides X-axis detection 604, such as azimuth information. A second long axis 622 of the second rectangle is parallel to the Y axis of the second detector array 192(2), and perpendicular to the X axis.

The first detector array 194(1) provides first output that is indicative of one or more of the position and distance of the first portion 422 of light that forms the first rectangular beam shape 198(1), relative to the center of the first detector array 194(1), with respect to the Y axis. For example, the first output is indicative of an elevation of the incoming light 380 relative to the center of the first detector array 194(1). The first output may comprise a first output signal(s) 360(1).

The second detector array 194(2) provides second output that is indicative of one or more of the position and distance of the second portion 610 of light that forms the second rectangular beam shape 198(2), relative to the center of the second detector array 194(2), with respect to the X axis. For example, the second output is indicative of an azimuth of the incoming light 380 relative to the center of the second detector array 194(2). The second output may comprise a second output signal(s) 360(2).

The first output and the second output may be used to operate the one or more actuators 306 of the moveable mirror 304. This allows the moveable mirror 304 to provide for two-dimensional tracking.

In other implementations the optical elements 408 may comprise other components. Various beam splitting techniques may be used to separate the incoming light 380. In one implementation, instead of a Wollaston prism 606, a beam splitter comprising a plurality of diffractive elements may be used. This beam splitter may comprise one or more features etched, printed, stamped, or otherwise present on a substrate such as glass or plastic. These respective features may refract, diffract, or reflect light to produce the beam splitting effect. In other implementations, a cubical beam splitter, half-silvered mirror, or other devices may be used to divide the incoming light 380.

The optical elements 408 may comprise other components to reshape the light emitted by the beam splitter. While cylindrical lenses 410 are depicted, in other implementations other beam shaping techniques may be used. For example, a beam shaper may comprise one or more features etched, printed, stamped, or otherwise present on a substrate such as glass or plastic. These respective features may refract, diffract, or reflect light to produce the beam shaping effect. For example, the features may produce an overall diffractive effect that reshapes the circular spot of incoming light 380 into a non-spot beam shape 198.

While the detector arrays 194(1) and 192(2) are depicted as quad cells, in other implementations other configurations may be used. For example, each of the detector arrays 194 may comprise two photodetectors 196 in a 1×2 arrangement, or four photodetectors 196 in a 1×4 arrangement, and so forth.

Figure 7:
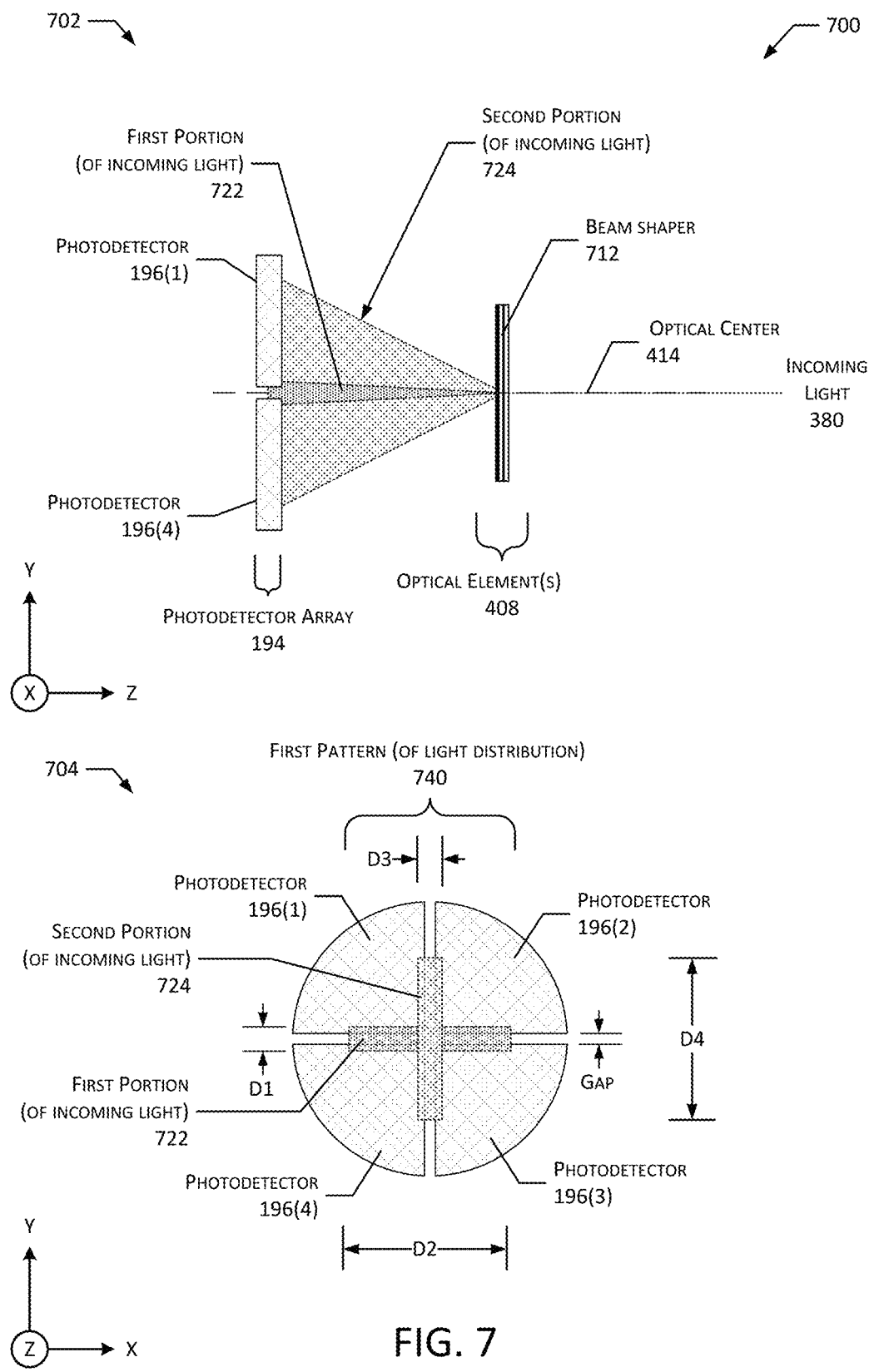
FIG. 7 is a block diagram of a third implementation of the optical detector system with a detector array and cross beam shape, according to some implementations.

FIG. 7 is a block diagram 700 of a third implementation of the optical detector system 124 with a detector array 194 and cross beam shape 198, according to some implementations.

In this implementation, the optical detector system 124 uses optical elements 408 comprising a beam shaper 712. For example, the beam shaper 712 may comprise one or more features etched, printed, stamped, or otherwise present on a substrate such as glass or plastic. These respective features may refract, diffract, or reflect light to produce the beam shaping effect that results in first pattern 740 approximating a cross pattern, as shown here. The first pattern 740 comprises a first portion 722 that is a first rectangle and a second portion 724 that is a second rectangle. The first portion 722 and the second portion 724 are perpendicular to one another, and are centered on one another, producing the first pattern 740 having a cruciform or "+" shape.

In some implementations the sizes of the first rectangle and the second rectangle may differ. For example, a first length of the first rectangle along a long axis of the first rectangle and a second length of the second rectangle along a long axis of the second rectangle may be the same or may differ. Continuing the example, the second length may be greater than the first length.

Figure 8:
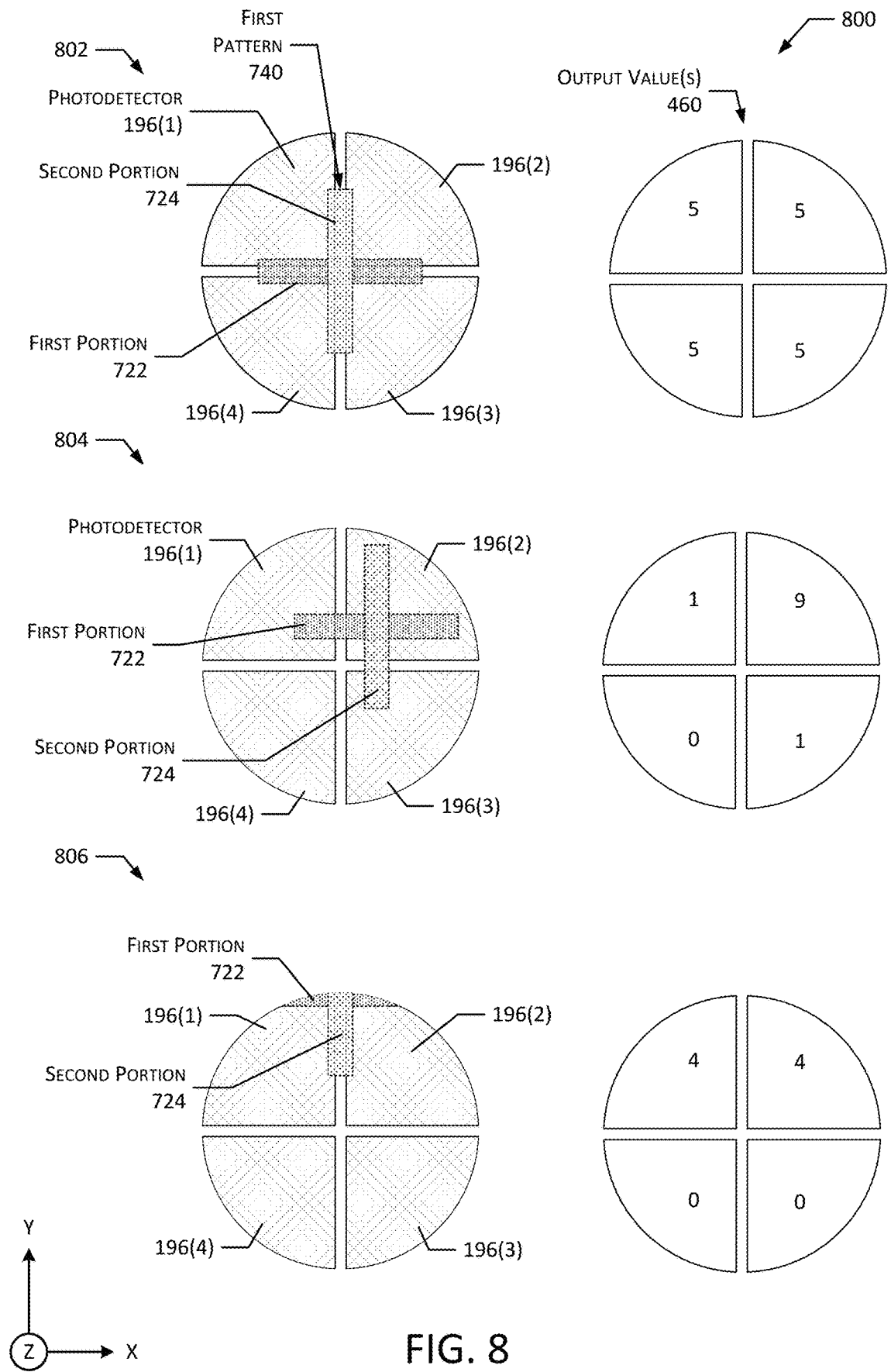
FIG. 8 depicts output values produced by the implementation of FIG. 7 under various configurations of incoming light, according to some implementations.

FIG. 8 depicts at 800 output values produced by the implementation of FIG. 7 under various configurations of incoming light 380, according to one implementation. In this depiction, a first column to the left of the page depicts a front view of the detector array 194 and the first pattern 740 of incoming light 380 on the photodetectors 196 in the detector array 194. A second column depicts output values 460 from the respective photodetectors 196 that would correspond to the configuration of incoming light 380 shown in the first column. The output values 460 are indicative of light impinging upon a photodetector 196. For example, the output values 460 may be indicative of an intensity of light impinging on the photodetector 196.

At 802 the first pattern 740 is centered on the detector array 194. The first pattern 740 is evenly divided across the four photodetectors 196(1)-(4). As a result, the corresponding output values 460 of the photodetectors 196 are all equal.

At 804 the first pattern 740 has translated upwards along a Y axis, and translated to the right along an X axis. The first pattern 740 is now predominately covering the second photodetector 196(2). However, some of the first pattern 740 of the incoming light 380 is incident on the first photodetector 196(1) and the third photodetector 196(3). As a result, the corresponding output values 460 for photodetectors 196(1) and 196(3) are the same. Because of the greater incident area on the second photodetector 196(2) of incoming light 380 compared to the photodetectors 196(1) and 196(3), the output value 460 from the second photodetectors 196(2) is significantly greater than the output values from photodetectors 196(1) and 196(3). As no incoming light 380 is impinging upon the fourth photodetector 196(4), the output value 460 from the fourth photodetector 196(4) is zero.

At 806, the first pattern 740 is translated upwards along the Y axis, is centered along the X axis, and is almost bisected by an edge of the detector array 194, with the first pattern 740 being just within a boundary of the detector array 194. The first pattern 740 now only covers a portion of the first photodetector 196(1) and the second photodetector 196(2). As a result, the corresponding output values 460 for photodetectors 196(1) and 196(2) remain the same. The output values 460 for photodetectors 196(3) and 196(4) are now zero, as no incoming light 380 is incident on either.

The output values 460 may be interpreted to determine one or more of a direction or a distance of the non-spot beam shape 198, or a portion thereof, with respect to a predetermined point on the detector array 194. For example, as shown at 804, if the greatest output value 460 is provided by the second photodetector 196(2), then the direction of a center of the beam shape 198 relative to the center of the detector array 194 may be determined to be "upper right" or an equivalent angle or other value. The precision of the direction may be refined by performing additional assessment of the output values 460. In some implementations a function or lookup table may be used to determine a direction based on the output values 460.

The distance of the non-spot beam shape 198 with respect to a predetermined point on the detector array 194 may also be determined based on the output values 460. For example, a function or lookup table may be used to determine a distance between a center of the beam shape 198 and the center of the detector array 194.

While the cross-shaped first pattern 740 is depicted here, it is understood that the other non-spot beam shapes 198 may operate in similar fashion. By using the non-spot beam shapes 198, the transfer function exhibits a greater slope factor, reducing the NEA compared to a circular beam impinging upon the detector array 194.

Figure 9:
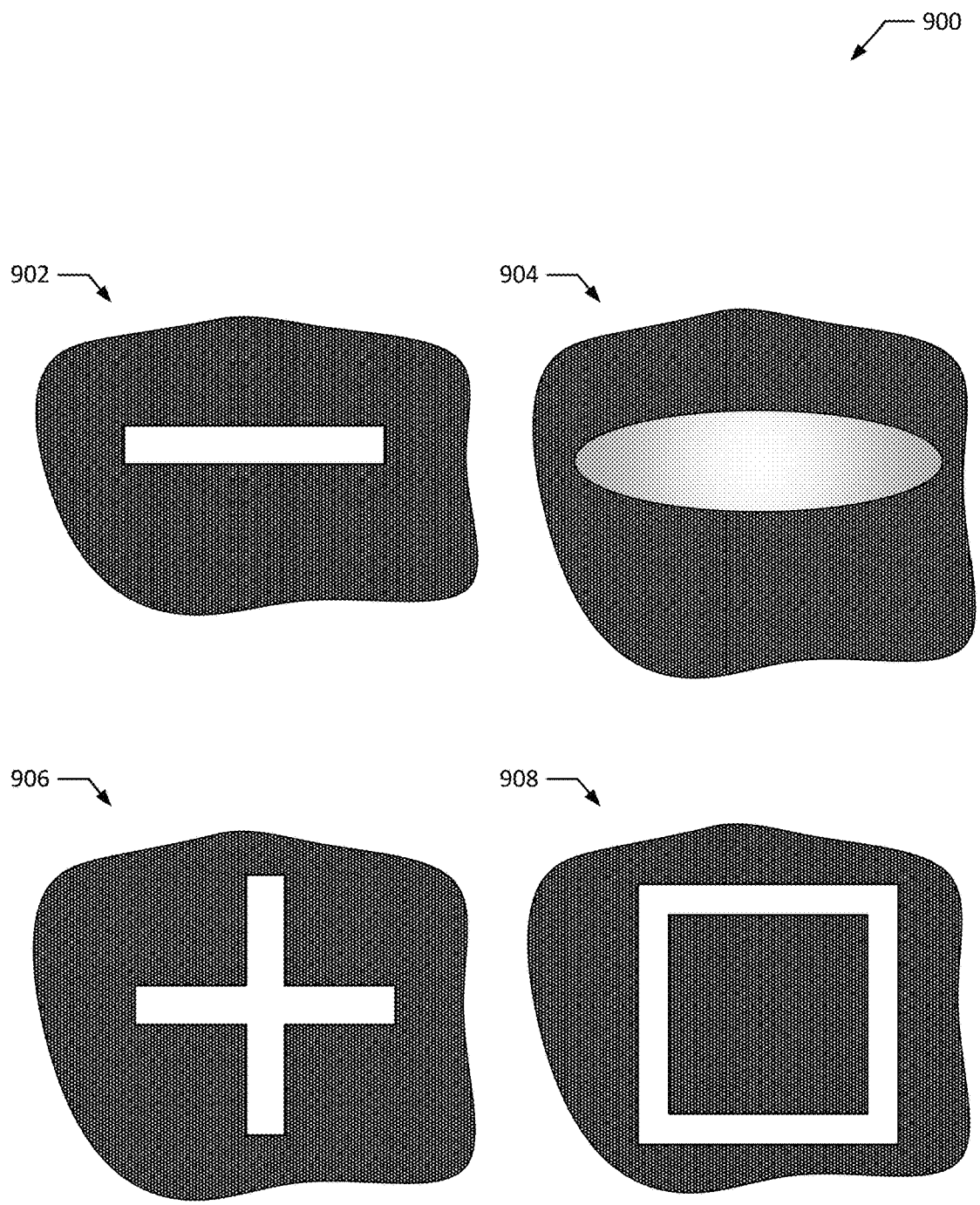
FIG. 9 depicts various non-spot beam shapes that may be used by the optical detector system, according to some implementations.

FIG. 9 depicts various non-spot beam shapes 198 that may be used by the optical detector system 124, according to some implementations. These beam shapes 198 are illustrative, and it is understood that other shapes may be used.

Depicted is a bar or rectangle 902, ellipse 904 with high aspect ratio, cross 906, and open-center square 908.

Additionally, some shapes are depicted as having abrupt edges for ease of illustration, and not necessarily by way of limitation. For example, instead of a precise "+" shape as shown at 906, a "smeared" or more diffuse beam shape 198 may be used.

The intensity of light per unit area within a non-spot beam shape 198 may not be uniform. For example, the beam shape 198 shown at 904 exhibits slightly greater intensity per unit area towards a center than at the edges.

Figure 10:
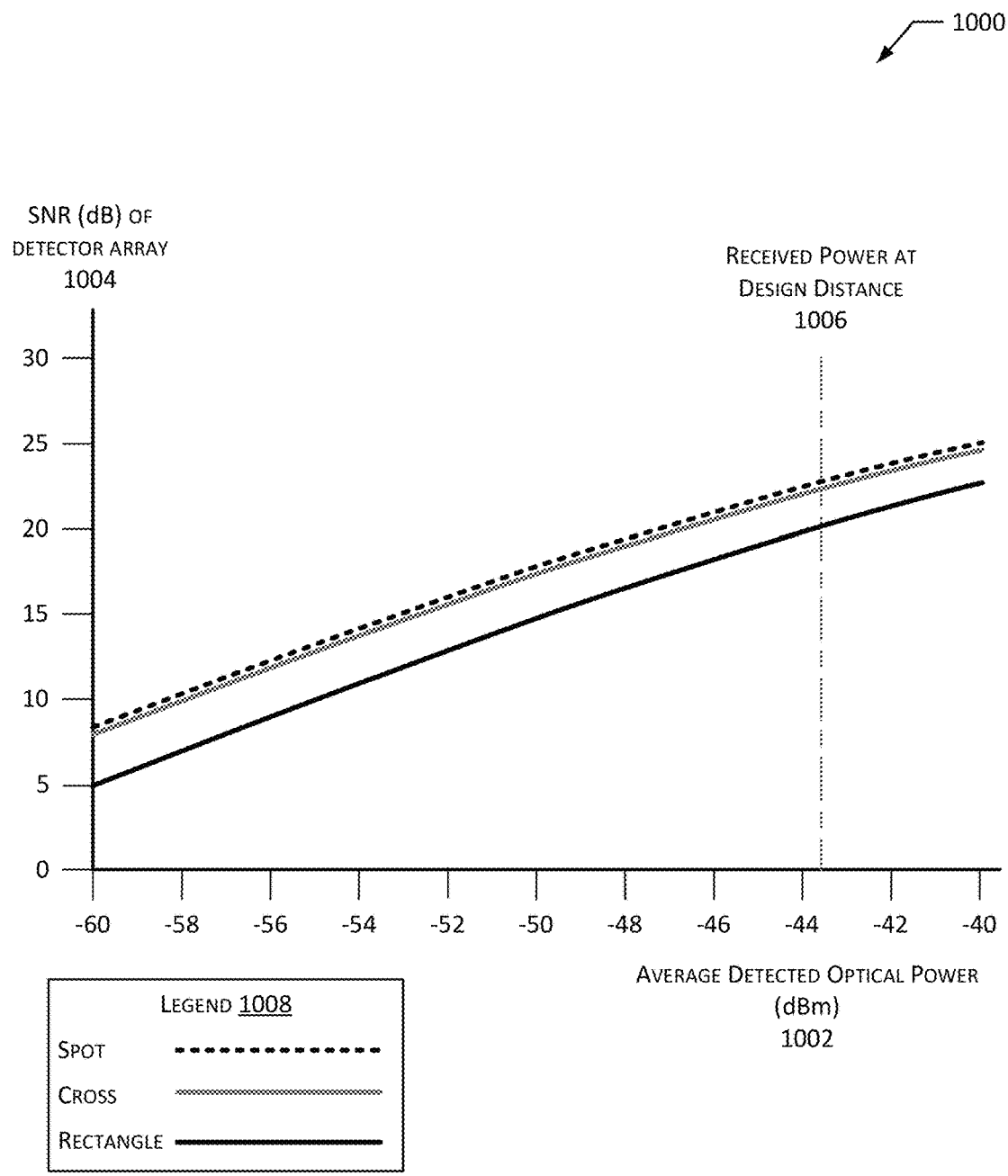
FIG. 10 is a graph of signal-to-noise ratio (SNR) with respect to average detected optical power as measured by a quad cell detector array for various beam shapes, according to some implementations.

FIG. 10 is a graph 1000 of signal-to-noise ratio (SNR) with respect to average detected optical power as measured by a quad cell detector array 194 for various beam shapes, according to some implementations. For the purposes of this graph, the gap between photodetectors 196 is assumed to be 20 micrometers. For example, the detector array 194 may comprise a GAP1000Q indium gallium arsenide quadrant photodiode from GPD Optoelectronics Corp., of Salem, N.H., United States of America.

The X axis depicts average detected optical power (in dBm) 1002 while the Y axis depicts the signal to noise ratio (SNR) (in dB) 1004 of the detector array 194. In this illustration, a lower SNR 1004 is associated with better system performance. To facilitate comparison, at 1006 a specified received power at design distance of 2600 kilometers is shown.

As shown by the legend 1008, the graph depicts curves for a conventional spot beam, a cross 906 beam shape 198, and a rectangular 902 beam shape 198. Compared to the conventional spot beam, the cross 906 exhibits a lower SNR 1004. The rectangle 902 beam shape 198 shows an even greater decrease in SNR 1004 compared to the cross 906. For the purposes of this graph, a 3 dB loss due to the inclusion of the Wollaston prism 606 for the implementation shown in FIG. 6 is taken into consideration.

Compared to a conventional spot beam that is circular in cross section, the non-spot beam shapes 198 exhibit substantial improvements in performance. The advantages of the non-spot beam spaces 198 is apparent even in cases of a circular beam with a "top hat" or approximately uniform power distribution with regard to radial distance from center, a spot beam having a Gaussian distribution of intensity with regard to radial distance from center, and so forth.

Figure 11:
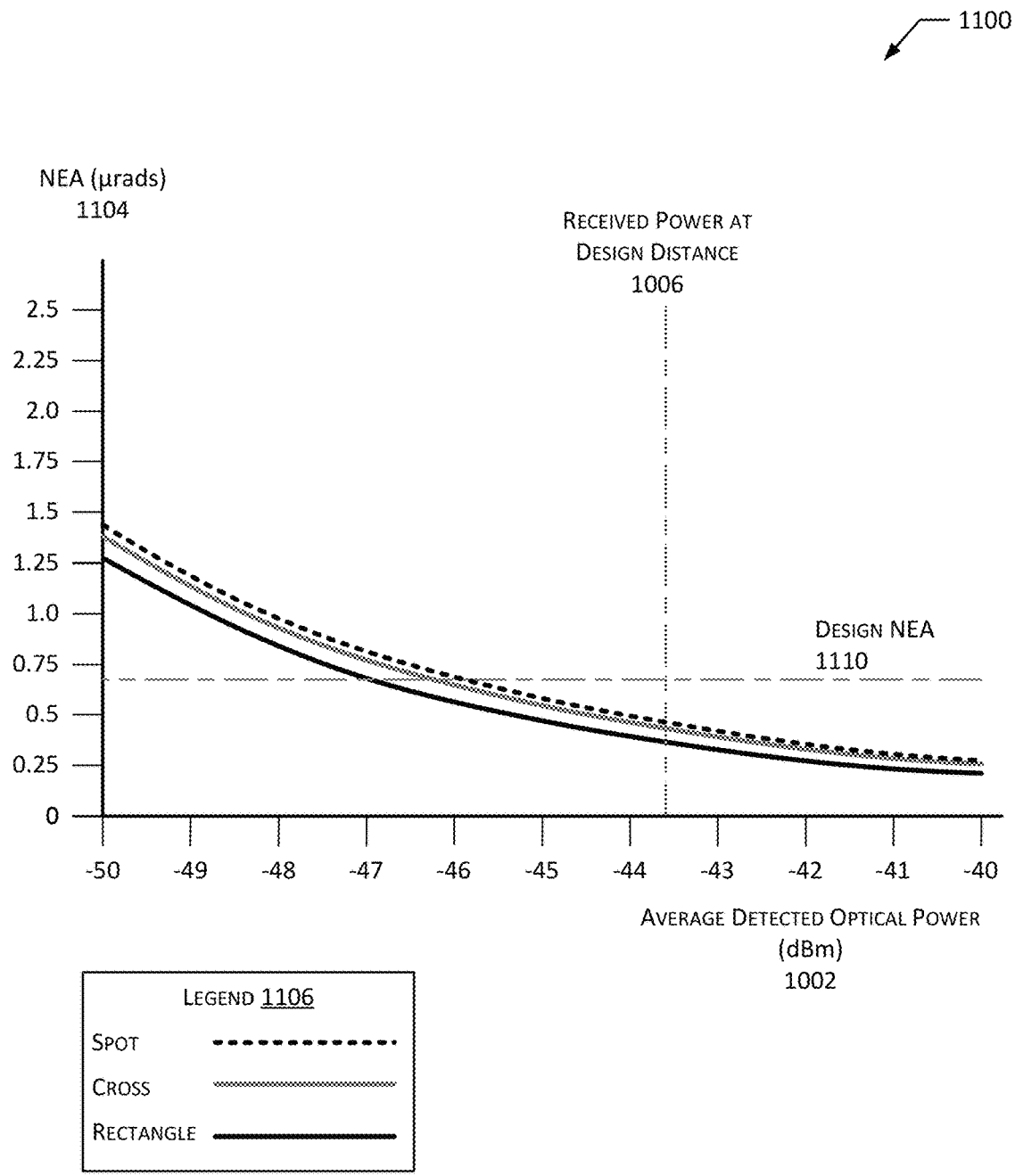
FIG. 11 is a graph of noise equivalent angle (NEA) with respect to average detected optical power as measured by a quad cell detector array for various beam shapes, according to some implementations.

FIG. 11 is a graph 1100 of noise equivalent angle (NEA) with respect to average detected optical power as measured by a quad cell detector array 194 for various beam shapes 198, according to some implementations. FIG. 11 utilizes the same assumptions as FIG. 10.

As shown by the legend 1106, the graph depicts curves for a conventional spot beam, a cross 906 beam shape 198, and a rectangular 902 beam shape 198. For the purposes of this graph, a 3 dB loss due to the inclusion of the Wollaston prism 606 for the implementation shown in FIG. 6 is taken into consideration.

The X axis depicts average detected optical power (in dBm) 1002 while the Y axis depicts the NEA 1104 in microradians. In this illustration, a lower NEA 1104 is associated with better system performance. To facilitate comparison, at 1006 a specified received power at design distance of 2600 kilometers is shown. Also shown is a design NEA 1110 value. For the system to perform as designed, the NEA 1104 should be less than the design NEA value 1110. Greater differences between the two, below the design NEA 1110 value, improve system performance.

As with FIG. 10, curves are shown for the conventional spot beam, the cross 906 beam shape 198, and the rectangle 902 beam shape 198. Compared to the conventional spot beam, the cross 906 and the rectangle 902 both exhibit lower NEA 1104. In this example, the rectangle 902 provides the lowest NEA 1104, well below the design NEA 1110.

It is understood that various possible non-spot beam shapes 198 are possible. These various non-spot beam shapes 198 may be used in conjunction with a variety of different detector array 194 configurations.

FIGS. 10 and 11 are based on the GPD Optoelectronics Corp. GAP1000Q detector array 194. The following Table 1 presents calculated parameters for several the GAP1000Q photodetector and the G6849-01 quadrant detector from Hamamatsu Corporation, Bridgewater, N.J., United States of America. The GAP1000Q ("GPD") exhibits a 20 micrometer gap between adjacent photodetectors 196. The G6849-01 ("HAM") exhibits a 30 micrometer gap between adjacent photodetectors 196.

The Gaussian beam presented is assumed to be circular with a diameter of 90 micrometer $1/e^2$. The spot beam is assumed to be an "Airy-like" beam with a 90 micrometer diameter. The cross 906 is assumed with have distances D1 and D3 (the "thickness" of each arm) of 44 micrometers. The rectangle 902 is assumed to have a distance D1 (the "height" of the rectangle) of 44 micrometers.

For the purposes of calculating the data in Table 1, specifications from the data sheets of the GPD and HAM detector arrays 194 has been used. The electrical bandwidth is assumed to be 2 kilohertz, the modulation index is assumed to be 0.1, and the transimpedance amplifier (TIA) noise is assumed to be 2 $pAHz^{0.5}$.

The "Loss on quad" value is the loss attributable to the incoming light 380 impinging upon a non-responsive gap in the respective detector array 194, and is expressed in dB. The slope factor ("SF") is given in units of $radians^{-1}$.

TABLE 1

| Beam | HAM Loss on Quad (db) | GPD Loss on Quad (db) | HAM Calculated SF | GPD Calculated SF |
|---|---|---|---|---|
| Gaussian | 5.9 | 3.6 | 18849 | 16485 |
| Spot | 4.1 | 2.6 | 13975 | 11857 |
| Cross | 5 | 2.82 | 22447 | 13573 |
| Rectangle | 5 | 2.82 | 44990 | 27123 |

As described with regard to the discussion of FIG. 5, an increase in the SF results in improved NEA. Even assuming the 3 dB loss in power delivered to the respective detector arrays 194(1) and 194(2) assumed in the rectangle 902 shape that results from the implementation of FIG. 6, a substantial increase SF is observed.

The circuitry, processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a detector array comprising:
        a first photodetector;
        a second photodetector;
        a third photodetector;
        a fourth photodetector; and
        wherein the first photodetector is adjacent to the second photodetector, the second photodetector is adjacent to the third photodetector, the third photodetector is adjacent to the fourth photodetector, and the fourth photodetector is adjacent to the first photodetector;
    one or more optical elements, wherein the one or more optical elements receive incoming light and generate a non-spot beam shape on the detector array; and
    electronics configured to:
        determine, based on first output from the first photodetector, second output from the second photodetector, third output from the third photodetector, and fourth output from the fourth photodetector:
            first data indicative of a direction of the non-spot beam shape relative to a predetermined point on the detector array; and
            second data indicative of a distance between the non-spot beam shape and the predetermined point.

2. The system of claim 1, wherein the one or more optical elements comprise one or more of:
    a cylindrical lens, or
    a beam shaper comprising a plurality of diffractive elements.

3. The system of claim 1, wherein the non-spot beam shape is rectangular and has a first dimension and a second dimension, wherein the second dimension is at least twice the first dimension.

4. The system of claim 1, wherein the non-spot beam shape comprises a first rectangle and a second rectangle, wherein the second rectangle is perpendicular to the first rectangle.

5. The system of claim 1, wherein the non-spot beam shape has at least one edge, wherein the at least one edge is perpendicular to a first line extending along a line between the first photodetector and the fourth photodetector.

6. The system of claim 1, wherein the first photodetector and the second photodetector are separated by a first distance; and
    wherein a first dimension of the non-spot beam shape is greater than the first distance.

7. The system of claim 1, wherein the first photodetector and the second photodetector are separated by a first distance; and
    wherein a first dimension of the non-spot beam shape is less than the first distance.

8. The system of claim 1, wherein the non-spot beam shape comprises a first rectangle and a second rectangle, wherein the second rectangle is perpendicular to the first rectangle, and wherein the second rectangle overlaps at least a portion of the first rectangle.

9. A system comprising:
a first detector array comprising a first plurality of photodetectors;
a second detector array comprising a second plurality of photodetectors;
a first cylindrical lens to direct a first portion of incoming light to the first detector array, wherein the first portion of the incoming light on the first detector array is shaped as a first rectangle having a first long axis parallel to a first axis; and
a second cylindrical lens to direct a second portion of the incoming light to the second detector array, wherein the second portion of the incoming light on the second detector array is shaped as a second rectangle having a second long axis, and further wherein the second long axis is perpendicular to the first axis.

10. The system of claim 9, wherein:
the first cylindrical lens has a third long axis that is parallel to the first axis; and
the second cylindrical lens has a fourth long axis that is perpendicular to the first axis; and
the system further comprising:
a Wollaston prism that:
accepts the incoming light;
directs the first portion of the incoming light towards the first cylindrical lens; and
directs the second portion of the incoming light towards the second cylindrical lens.

11. The system of claim 9, the first plurality of photodetectors comprising a first photodetector and a second photodetector; and
wherein a first edge of the first portion of the incoming light on the first detector array is perpendicular to a first line extending between the first photodetector and the second photodetector.

12. The system of claim 9, the first plurality of photodetectors comprising a first photodetector and a second photodetector, wherein the first photodetector and the second photodetector are separated by a first distance; and
wherein a first dimension of the first rectangle is greater than the first distance, the first dimension being measured perpendicular to the first long axis.

13. The system of claim 9, the first plurality of photodetectors comprising a first photodetector and a second photodetector, wherein the first photodetector and the second photodetector are separated by a first distance; and
wherein a first dimension of the first rectangle is less than or equal to the first distance, the first dimension being measured perpendicular to the first long axis.

14. The system of claim 9, wherein:
the first rectangle has a first dimension measured perpendicular to the first long axis;
the second rectangle has a second dimension measured perpendicular to the second long axis; and
the first dimension is greater than the second dimension.

15. The system of claim 9, further comprising electronics to:
determine, based on output from the first detector array, first output indicative of one or more of:
a first direction relative to a predetermined point on the first detector array; or
a first distance relative to the predetermined point on the first detector array; and
determine, based on output from the second detector array, second output indicative of one or more of:
a second direction relative to a predetermined point on the second detector array; or
a second distance relative to the predetermined point on the second detector array.

16. The system of claim 9, further comprising:
a mirror;
one or more actuators, wherein the one or more actuators operate to move the mirror; and
electronics to:
determine output from one or more of the first detector array or the second detector array; and
operate the one or more actuators based on the output.

\* \* \* \* \*